No. 896,932. PATENTED AUG. 25, 1908.
G. W. NEWTON.
TRAY FOR EGG TESTERS.
APPLICATION FILED JULY 23, 1907.

2 SHEETS—SHEET 1.

Witnesses.
F. C. Dahlberg
N. O. Bennett

Inventor.
George W. Newton.
by Orwig & Lane attys.

No. 896,932. PATENTED AUG. 25, 1908.
G. W. NEWTON.
TRAY FOR EGG TESTERS.
APPLICATION FILED JULY 23, 1907.
2 SHEETS—SHEET 2.
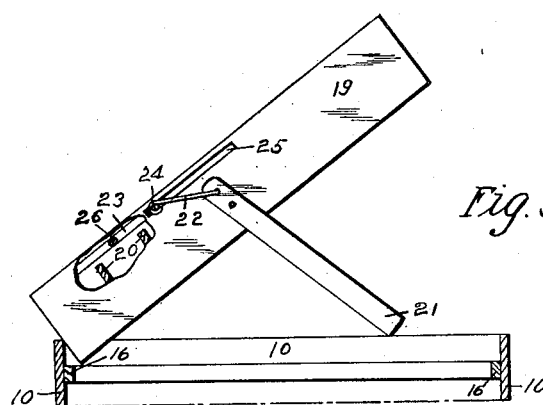
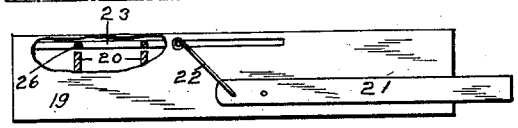
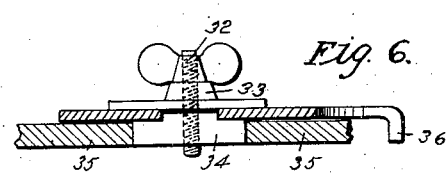
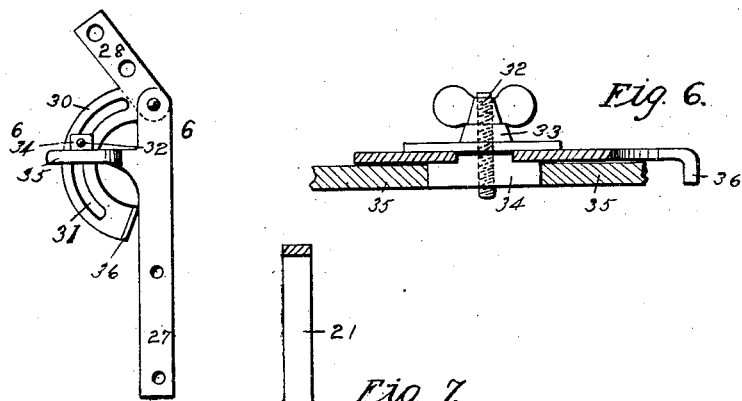
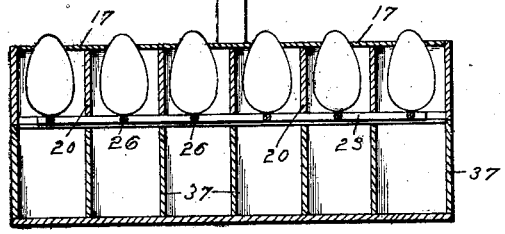
Witnesses.
F. C. Dahlberg
M. E. Bennett
Inventor.
George W. Newton.
by Orwig & Lane Atty's

UNITED STATES PATENT OFFICE.

GEORGE W. NEWTON, OF NEWTON, IOWA.

TRAY FOR EGG-TESTERS.

No. 896,932.      Specification of Letters Patent.      Patented Aug. 25, 1908.

Application filed July 23, 1907. Serial No. 385,160½.

*To all whom it may concern:*

Be it known that I, GEORGE W. NEWTON, a citizen of the United States, residing at Newton, in the county of Jasper and State of Iowa, have invented a new and useful Tray for Egg-Testers, of which the following is a specification.

The object of my invention is to provide an egg tester of simple, durable and inexpensive construction, in which artificial light is unnecessary, and in which by an arrangement of mirrors, natural light may be utilized in such a way that the operator may clearly see through a large number of eggs, as required for testing them.

A further object is to provide improved means for handling eggs, and for depositing them all at the same time, into an egg crate.

My invention consists in the construction, arrangement and combination of the various parts of the device, whereby the objects contemplated are attained, as hereinafter more fully set forth, pointed out in my claims and illustrated in the accompanying drawings, in which—

Figure 1:
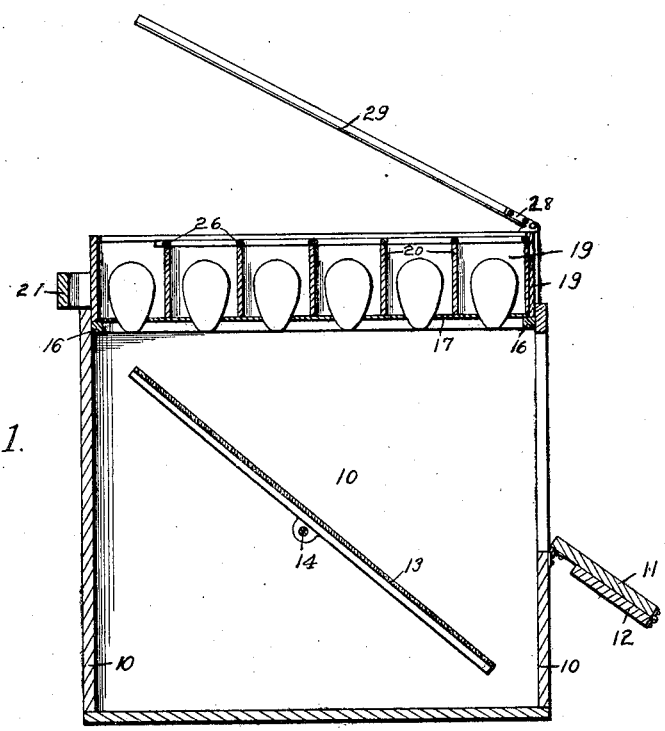
Figure 2:
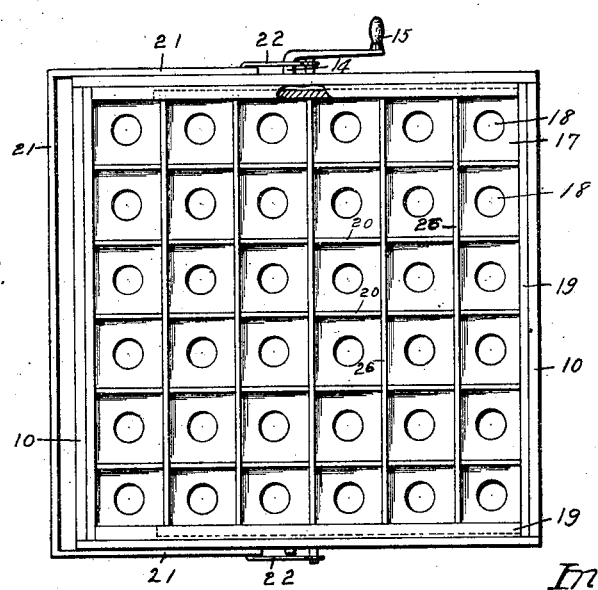

Figure 1 shows a vertical transverse sectional view through the complete device embodying my invention, with a tray full of eggs in the top thereof. Fig. 2 shows a top or plan view of the complete device embodying my invention. Fig. 3 shows a sectional view of the top of the frame of the body portion of the device, and a side view of the egg tray in an elevated position above the top of the body portion, part of the tray being broken away to show the position of the partitions therein relative to the egg supporting cross wires. Fig. 4 shows an end view of the tray, with part broken away to show the egg retaining wires in position directly above the partitions. Fig. 5 shows an enlarged detail side view of one of the hinged devices for adjustably supporting the upper mirror. Fig. 6 shows an enlarged detail sectional view of same, on the line 6—6 of Fig. 5. Fig. 7 shows a transverse sectional view of the tray in its inverted position with the egg retaining wires in position, supporting eggs therein, said tray being shown directly above an egg crate, having compartments therein for the eggs.

Referring to the accompanying drawings, I have used the reference numeral 10 to indicate the frame of the body portion, which is preferably made of a rectangular box like structure, inclosed on all sides except the top, and the upper portion of the rear. A door 11 is hinged to the rear to cover this opening, and this door is provided with a hinged section 12, so that the opening may be either wholly or partially closed, as desired. Mounted within the body portion 10 is a mirror 13, fixed to a longitudinal shaft 14. This shaft extends through the ends of the body portion, and has attached to one end a crank 15, by which the mirror may be adjusted to any desired angle.

Extended around the top of the frame on the interior thereof, is a shelf 16, to receive the egg holding tray. This egg holding tray comprises a bottom 17, formed with openings 18 to receive eggs. It also has sides and ends 19, and partitions 20, said partitions being arranged to form egg compartments. The tray is of such size as to fit down into the top of the body portion 10, and to rest upon the shelf 16. Hinged to the ends of the tray is the bail 21, which is large enough to lie parallel with the adjacent side of the tray, as shown in Figs. 1 and 2. The ends of the bail extend a short distance beyond their pivotal points, and have attached to them the links 22. Slidingly mounted in grooves on the inner faces of the ends of the tray, are the slide bars 23, having the outwardly projecting pins 24 extended through slots 25, in the ends of the tray. These pins are connected to the links 22 so that when the bail is moved from position in line with the sides 19, to position at right angles to them, both of the bars 23 will slide transversely of the tray. These bars 23 have fixed to them a series of egg supporting wires 26, which wires are in line with the longitudinal partitions 20 when the bail 21 is parallel with the sides of the tray, and when the bail is moved to position at right angles to the tray, as shown in Fig. 7, these wires 26 stand in position midway between the longitudinal partitions 20, thus retaining the eggs in the tray.

Fixed to the rear corners of the body portion 10 are the upright hinge members 27, these hinge members have pivoted to them the hinge members 28, which latter are secured to a mirror 29. I provide for adjustably securing this mirror 29 at any desired angle as follows: Formed on each of the hinge members 28 is a segmental arm 30, having a slot 31. A screw 32 is passed through the slot 31, and through a washer 33 resting against one side of the arm 30, and said screw is seated in a block 34 resting against the opposite side of the arm 30. Formed on the hinge member 27 is a forwardly projecting arm 35, designed to be engaged by the block 34. I provide for limiting the rearward movement of the mirror 29 by means of a lug 36, formed on the lower end of the arm 30, and designed to engage the under surface of the arm 35, when said mirror is tilted rearwardly past a vertical line.

In Fig. 7 of the drawings, I have shown an egg tray indicated by the numeral 37, which is of the ordinary kind now in common use, and contains compartments to receive eggs.

In practical use, I first fill the egg tray of the device with eggs, as shown in Fig. 1, and then adjust the mirror 29 so that it will direct sunlight downwardly through the top of the tray. I then adjust the mirror 13 so that the operator may, by looking into the opening at the rear of the body portion 10, see the eggs reflected upon said mirror. The interior of the body portion 10 is dark, and the sunlight reflected upon the top of the eggs by the mirror 29, will be sufficient to enable the operator to see through the eggs, and thus test them. The incline of the mirror 29 may be changed as follows: I first loosen the screw 32 so that the block 34 and the washer 33 may be easily moved on the segmental arm 30. Then when they are in the desired position the screw 32 is tightened, and the mirror inclined forwardly until the blocks 34 rest upon the arms 35. After one tray full of eggs has been adjusted, the operator grasps one edge of the tray, and inclines it upwardly to the position shown in Fig. 3 at the same time the bail or handle 21 is turned to position at right angles to the tray. This will cause the egg retaining wires 26 to close the ends of the compartments in the tray, opposite from the bottom 17, then the tray may be inverted as shown in Fig. 7, and carried to position directly over a tray for receiving eggs. Then when in this position, the bail 21 may be turned downwardly, thus permitting the eggs to drop into the tray 37.

Having thus described my invention, what I claim and desire to secure by Letters Patent of the United States, therefor, is—

1. In a device of the class described, the combination of a tray comprising a bottom with openings therein to receive eggs, and partitions to form egg compartments above the bottom, the upper end of the tray being open, a series of rods extended across the top of the tray, a bail pivoted to the tray, and means for connecting the bail with said rods, said parts so arranged that when the bail is in a horizontal position the rods will stand over the partitions, and when the bail is moved downwardly to position at right angles to the tray, the rods will stand over the centers of the compartments to retain eggs therein.

2. In a device of the class described, the combination of a tray comprising a bottom having openings therein to receive eggs, and partitions above the bottom to form egg chambers, bars slidingly mounted in the ends of the tray, rods fixed to said bars, and normally standing over the tops of the longitudinal partitions, a bail pivoted to the ends of the tray and links connecting the bail with said sliding bars, said parts so arranged that a movement of the bail from the horizontal position to a downwardly inclined position will cause the rods to move to position over the centers of the egg compartments.

Des Moines, Iowa, May 17, 1907.

GEORGE W. NEWTON.

Witnesses:
A. M. CARL,
E. E. DUER.